May 16, 1961 C. E. A. GOLNER 2,984,013
ADJUSTABLE LIMIT GAGES
Filed Dec. 5, 1958
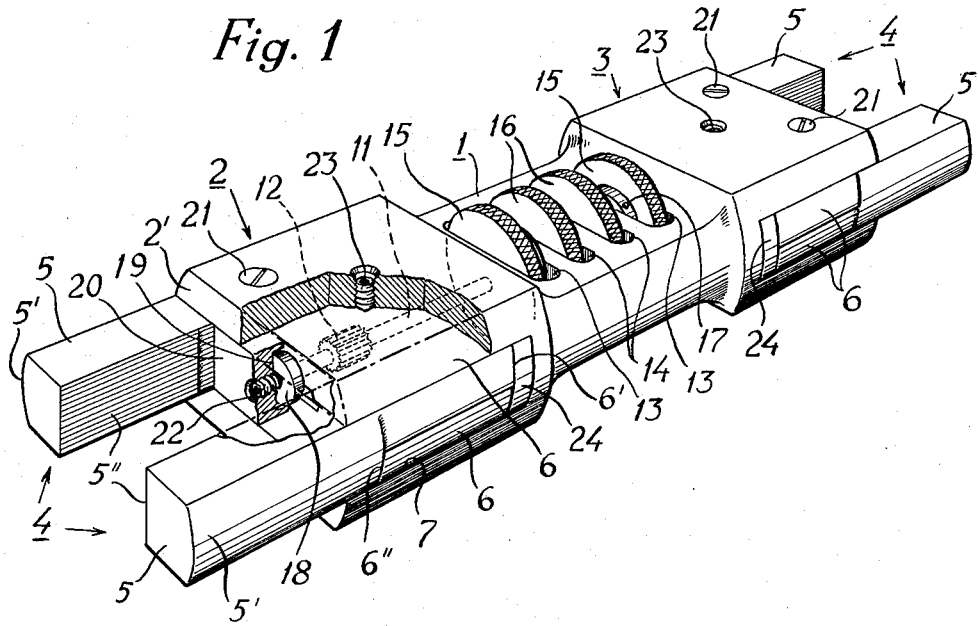
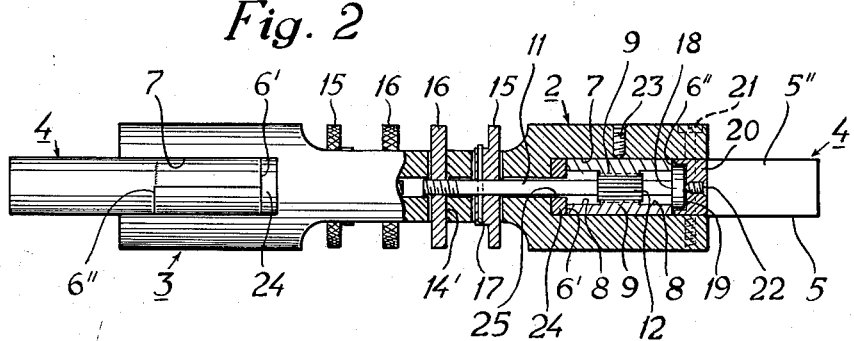
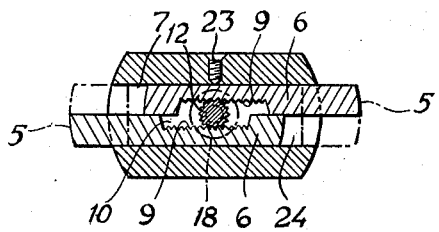
Inventor:
Carl Eivin Artur Golner United States Patent Office 2,984,013
Patented May 16, 1961

2,984,013
ADJUSTABLE LIMIT GAGES
Carl Eivin Artur Golner, Tyreso, Sweden (% Ingenjörs-byrån Patentservice, Dukvagen 2, Bromma, Sweden)
Filed Dec. 5, 1958, Ser. No. 779,269
3 Claims. (Cl. 33—143)

This invention relates to a gage for determining the correctness of pieces of machinery as to size and more particularly the invention is concerned with such adjustable limit gages which are used in series production of machine parts and the like to rapidly ascertain with a high degree of accuracy that the size of each produced article is kept within certain permitted tolerance limits.

Fixed gages for such purposes are very old and still most commonly used in factories the world over, but it will be readily understood that they suffer from certain disadvantages. For the first, each such fixed gage is useful only for a certain predetermined size and tolerance and, therefore, a very large—and highly expensive—assortment of such gages is necessary to meet varying demands in a factory. For the second, each gage will always become worn after a certain time of use, and then it will no longer be capable to fill its place in the assortment—refinishing the worn surfaces by grinding or the like is, of course, always possible but will result in an unpermissible deviation from the original dimensions of the gage. For the third, most fixed gages are designed for checking either inside dimensions alone or outside dimensions alone which still more reduces the usefulness of each gage and doubles the assortment necessary for meeting varying demands.

It is a general object of this invention to overcome these disadvantages of conventional, fixed limit gages by presenting an adjustable gage, which, within certain limits, may be reset from time to time to meet varying demands or to compensate for wear.

Already prior to this invention certain types of adjustable limit gages have been proposed but they have not been satisfactory from a practical point of view, particularly because their "measuring range" was rather restricted and because they were still unable to check both inside and outside dimensions in spite of their high prices (caused by the high degree of accuracy which is necessary in the production of such instruments).

Therefore, it is another object of this invention to provide an improved adjustable gage being capable of checking with highest possible accuracy both inside and outside dimensions within relatively wide limits.

A further object of the invention is to provide an improved adjustable combination gage in which the measuring jaws may be readily set without the use of tools in a very convenient manner so that setting and preliminary locking of the jaws may take place also when the jaw carrying head of the instrument is not readily accessible, e.g. because it enters a bore from which the measure of the jaws is taken.

Other objects and advantages of the improved gage according to the invention will become apparent from the following detailed description of a preferred form of such an instrument which has been illustrated in the accompanying drawing, wherein Fig. 1 is a perspective view, partly in section, of the adjustable limit gage, Fig. 2 is a side elevation, partly in longitudinal section, of the instrument at a slightly reduced scale and Fig. 3 is a cross section of the one head portion of the gage and showing the gear and rack mechanism for adjusting the jaws.

The adjustable limit gage illustrated in the drawing comprises broadly a solid handle portion 1 having jaw carrying head portions—generally designated by numerals 2 and 3 respectively—at its respective ends. These two head portions 2 and 3 are structurally identical but when the instrument is in use the jaws 4 of the one head are set at the minimum tolerance limit while the jaws of the other head are set at the maximum tolerance limit. Thus, assuming that e.g. a female diameter is to be checked, if the minimum limit head readily enters a bore but the maximum limit head does not, the bore will obviously have a diameter which falls within the prescribed tolerance limits, but if both heads of the instrument enter the bore, the diameter of the bore is above the prescribed upper tolerance limit so that the bore cannot be accepted. Similarly, if neither the maximum limit head nor the minimum limit head is capable to enter the bore, the diameter of that bore is, of course, too small to be accepted.

Since both head portions 2 and 3 of the instrument are identical, it will obviously be satisfactory to describe the construction of one of them only. As will appear from Fig. 1 and as stated above each head has two adjustable and identical measuring jaws 4. Each such jaw 4 generally takes the form of an L having its one shank 5 extending longitudinally of the instrument and projecting far beyond the outer end face 2' of the head 2 and its other shank 6 extending transversely to the instrument head 2 through a groove or slot 7 formed therein. The free portion of the shank 5 has twice the thickness of the rest of the jaw and presents a curved outside or back 5' and a plane inner surface 5" facing the same surface of the other jaw. Both these surfaces are very accurately ground—the back surface 5' with a radius being equal to or slightly less than half the diameter of the smallest bore for which the instrument is intended to be used—and particular care is exercised to make them extend parallel to each other in the longitudinal direction of the shank 5 and truly perpendicular to the bottom surface 6' of the other shank 6.

The thinner, transverse shank 6 of each jaw 4 faces with its outside the corresponding side wall of the transverse slot 7 in the instrument head 2, while the inside of the shank 6 is in sliding engagement with the corresponding surface of the shank 6 of the other jaw. By such overlapping arrangement of the jaw shanks 6 a very accurate guiding of the measuring jaws 4 is assured and this over a rather extended length of movement of the jaws, so that each instrument may be made to cover a wide range of measures.

In the facing insides of the jaw shanks 6 there is formed a recess 8 in each jaw, said recess extending across the shank 6 and having at least a strip-like part of its bottom formed as a rack 9 extending in the direction of movement of the jaw and having teeth projecting above the bottom surface of the recess 8. Thus, when the two jaws 4 are properly put together in the slot 7 as shown particularly in Fig. 3, an oblong opening 10 having toothed opposite sides is formed between the jaw shanks 6 and through this opening there extends a spindle 11 carrying a pinion 12 meshing with the racks 9 of both jaws 4.

As will be seen from Fig. 2 this spindle 11 extends into the handle portion 1 of the instrument longitudinally and centrally thereto. In the handle 1 there are provided two slot-like openings 13 and 14 for each head 2 and 3 respectively, said openings running through the entire flattened body of the handle as shown for housing each a knurled hand wheel 15 and 16 respectively. One of these wheels 15 is secured to the passing spindle 11 by means of a pin 17, so that manipulation of the exposed portions of that wheel will cause the spindle and the pinion 12 to rotate and hence cause the jaws 4 of the related head 2 to move in or out if they are not locked in their previous positions.

The other hand wheel 16 has a threaded centre hole receiving the threaded inner end portion of the spindle 11. While the wheel 15 is relatively free to move in axial direction within its opening 13, the wheel 16 is arranged to abut against the side wall 14' of the opening 14 in order to tend to pull the spindle 11 axially into the handle 1 when rotated in the one direction. This action is utilized to lock the jaws 4 in set positions and for that purpose the opposite or outer end of the spindle 11 is extended beyond the pinion 12 and has a flat washer-like head 18 partly covering the inner edge surfaces 6" of the two jaw shanks 6. It will be readily understood that this head 18, when pulled inwardly towards the handle by proper rotation of the nut-like hand wheel 16, will abut the shanks 6 of the two jars and press them against the bottom of the slot 7 so that the jaws 4 are locked in their positions given by manipulation of hand wheel 15 when the jaws are still free to move.

The head 18 of the spindle 11 is housed in a cup-like recess 19 in a cross piece 20 bridging the opening end of the slot 7 between the jaws 4 to add stability to the slotted head structure forming the guide for the measuring jaws. This cross piece 20 is secured by means of countersunk screws 21 to the flat head portions embracing the slot 7 and has, coaxial with the recess 19, a threaded hole in which a locking screw 22 is received. By tightening that screw 22 against the top of the spindle head 18, the locking action originally obtained by turning the hand wheel 16 will be maintained also if the wheel 16 should be unintentionally rotated and loosened on the spindle 11. A similar locking screw 23 is received in a threaded hole through the one flat shank portion of each head 2 or 3 to press the jaws 4 firmly together within the slot 7. Both these locking screws 22 and 23 are, of course, only used when the set positions of the measuring jaws are to be maintained for a longer period of work.

To increase the accuracy of the instrument and facilitate its manufacture, the shanks 6 of the measuring jaws 4 do not rest directly on the bottom of the slot 7 but on a flat-surfaced ground plate 24 placed in the slot and having an aperture 25 for the through-passing spindle 11. It will be readily understood that the plate 24 is far easier to machine to a high degree of accuracy than is the bottom surface of slot 7 and, since the plate 24 is in perfect surface engagement with the accurately ground bottom surfaces 6' of the two jaws 4, the ground measuring surfaces 5' and 5" of the jaws will always be set in accurate parallel relationship, even if the bottom of the slot 7 is not quite perfect.

As described there is provided a very accurate and convenient adjustable limit gage capable of checking inside dimensions—between the outer jaw surfaces 5'—as well as outside dimensions—between the facing inner jaw surfaces 5". Furthermore there is provided an instrument which is extremely simple to reset because of the handy location of the hand wheels to be actuated for such purpose.

A particular advantage of the free jaw shanks 5 is that also an exact setting of the outer jaw surfaces 5' may be had by simply combining a suitable number of ordinary gage blocks between the inner jaw surfaces 5" and then tightening the jaws around them. For such simplified setting it is only necessary to know the width of each jaw 5 between the surfaces 5' and 5" and this width may be marked on each jaw or on the instrument head for convenience.

I claim:

1. In an adjustable gage for checking both inside and outside dimensions, the combination of a handle portion, a head portion at one end of said handle portion, a transverse slot in said head portion, two identical, L-shaped jaws each having its one shank extending into said transverse slot for being guided therein and the other shank projecting far beyond the end face of said head portion remote from said handle portion and having ground measuring surfaces on both the inside and the outside of its free portion, a flat-surfaced lining plate in said slot at the wall thereof adjacent said handle portion, said first shanks of the two jaws overlapping each other within said slot in a plane that is parallel to the longitudinal axis of the handle and head portions and being in engagement both with said lining plate and with each other, each such first jaw shank having a rack formed in that surface thereof facing the overlapping jaw shank, a spindle extending between said first jaw shanks in the longitudinal direction of said handle and head portions, a pinion secured to said spindle and engaging said racks of both said overlapping jaw shanks, said spindle extending through said lining plate into said handle portion, an opening in said handle portion transversed by said spindle, a first hand wheel received in said opening of the handle portion and secured to said spindle to rotate the latter and hence adjust said jaws, an end portion of said spindle extending beyond said overlapping jaw shanks in said slot, a flat head secured at that end of said spindle, said spindle having also a threaded end portion remote from said headed end, a nut-like second hand wheel threadingly engaging said latter spindle end portion and abutting said handle portion so as to be capable to tighten said flat head of the spindle against said overlapping jaw shanks within said slot to thereby press them against said flat-surfaced, ground plate in said slot by pulling said spindle axially through said handle and head portion.

2. In an adjustable gage for checking both inside and outside dimensions, the combination as claimed in claim 1, wherein each free other shank of each jaw has twice the thickness of the said one shank of the jaw which is received in said slot of said head portion.

3. In an adjustable gage for checking both inside and outside dimensions, the combination as claimed in claim 1, wherein additional means for locking said jaws relatively to said head portion are provided, said latter means comprising a locking screw entering the slot of said head portion for pressing said overlapping jaw shanks therein together.

References Cited in the file of this patent

UNITED STATES PATENTS

| 458,055 | Hunt et al. | Aug. 18, 1891 |
| 1,057,954 | Foulon | Apr. 1, 1913 |
| 1,398,871 | Livingston | Nov. 29, 1921 |
| 1,539,700 | Stramaglia | May 26, 1925 |
| 2,663,942 | Rudolph | Dec. 29, 1953 |
| 2,674,047 | Golner | Apr. 6, 1954 |